United States Patent
Shi et al.

(10) Patent No.: US 11,480,822 B2
(45) Date of Patent: Oct. 25, 2022

(54) DISPLAY SUBSTRATE COMPRISING A LIGHT-REFLECTING WALL HAVING A LIGHT-TRANSMISSIVE WALL AND A LIGHT-REFLECTING LAYER COVERING A TOP SURFACE AND SIDE SURFACES OF THE LIGHT-TRANSMISSIVE WALL, METHOD FOR MANUFACTURING THE SAME, AND DISPLAY DEVICE

(71) Applicant: BOE TECHNOLOGY GROUP CO., LTD., Beijing (CN)

(72) Inventors: Ge Shi, Beijing (CN); Shiyu Zhang, Beijing (CN); Ming Zhu, Beijing (CN); Haijun Niu, Beijing (CN); Yujie Liu, Beijing (CN); Zheng Fang, Beijing (CN); Yuyao Wang, Beijing (CN); Xiaochuan Chen, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 367 days.

(21) Appl. No.: 16/560,867

(22) Filed: Sep. 4, 2019

(65) Prior Publication Data

US 2020/0073167 A1 Mar. 5, 2020

(30) Foreign Application Priority Data

Sep. 4, 2018 (CN) .......................... 201811027111.6

(51) Int. Cl.
*G02F 1/1333* (2006.01)
*G02F 1/1335* (2006.01)
*G02F 1/13357* (2006.01)

(52) U.S. Cl.
CPC .. *G02F 1/133377* (2013.01); *G02F 1/133512* (2013.01); *G02F 1/133514* (2013.01);
(Continued)

(58) Field of Classification Search
CPC ......... G02F 1/133637; G02F 1/133377; G02F 1/13398; G02F 1/1677; G02B 5/0816
See application file for complete search history.

(56) References Cited

U.S. PATENT DOCUMENTS

2008/0198294 A1* 8/2008 Hwang ..................... G02F 1/09
349/96
2010/0085512 A1* 4/2010 Ueda ................. G02F 1/133609
362/97.3
(Continued)

FOREIGN PATENT DOCUMENTS

CN 106324742 A * 1/2017
CN 107728368 A 2/2018
(Continued)

OTHER PUBLICATIONS

First Chinese Office Action dated Oct. 12, 2020, for corresponding Chinese Application No. 201811027111.6.

*Primary Examiner* — Paul C Lee
(74) *Attorney, Agent, or Firm* — Kinney & Lange, P.A.

(57) ABSTRACT

A display substrate, a method for manufacturing the same, and a display device are provided. The display substrate includes a base substrate, a black matrix pattern on the base substrate, display units respectively in regions defined by the black matrix pattern, and a light-reflecting wall between at least two adjacent display units, where at least one of the at least two adjacent display units is a quantum dot display unit, and a reflectance of the light-reflecting wall to light in a first wavelength range is greater than a preset threshold.

14 Claims, 4 Drawing Sheets

(52) U.S. Cl.
 CPC .. *G02F 1/133528* (2013.01); *G02F 1/133553* (2013.01); *G02F 1/133602* (2013.01)

(56) References Cited

U.S. PATENT DOCUMENTS

| | | | |
|---|---|---|---|
| 2017/0293151 A1* | 10/2017 | Zha | H01L 27/3232 |
| 2017/0315409 A1* | 11/2017 | Cho | G02F 1/133617 |
| 2018/0045866 A1 | 2/2018 | Chae et al. | |
| 2018/0101056 A1 | 4/2018 | Lee et al. | |
| 2018/0210266 A1 | 7/2018 | Lius et al. | |
| 2018/0210280 A1* | 7/2018 | Chen | H01L 27/32 |

FOREIGN PATENT DOCUMENTS

| | | |
|---|---|---|
| CN | 107918227 A | 4/2018 |
| CN | 108107627 A | 6/2018 |
| CN | 108345142 A | 7/2018 |

* cited by examiner

DISPLAY SUBSTRATE COMPRISING A LIGHT-REFLECTING WALL HAVING A LIGHT-TRANSMISSIVE WALL AND A LIGHT-REFLECTING LAYER COVERING A TOP SURFACE AND SIDE SURFACES OF THE LIGHT-TRANSMISSIVE WALL, METHOD FOR MANUFACTURING THE SAME, AND DISPLAY DEVICE

CROSS-REFERENCE TO RELATED APPLICATION

This application claims a priority to Chinese Patent Application No. 201811027111.6 filed on Sep. 4, 2018, the disclosure of which is incorporated in its entirety by reference herein.

TECHNICAL FIELD

The present disclosure relates to the field of display technology, in particular to a display substrate, a method for manufacturing the same, and a display device.

BACKGROUND

Quantum dots (QDs), also known as nanocrystals, are nanoparticles made of elements in Groups II-VI or Groups III-V. A particle size of a quantum dot is generally between 1 to 20 nm, and since electrons and holes are quantum confined, a continuous band structure becomes a discrete energy level structure and fluorescence can be emitted after excitation.

Based on quantum effects, quantum dots have broad application prospects in fields such as solar cell, light-emitting device and optical biomarker. A quantum dot display substrate can be manufactured with quantum dots, which has the advantages of high color gamut and low power consumption.

SUMMARY

In an aspect, a display substrate is provided according to some embodiments of the present disclosure, including: a base substrate; a black matrix pattern on the base substrate; multiple display units respectively in multiple regions defined by the black matrix pattern; a light-reflecting wall between at least two adjacent display units, where at least one display unit of the at least two display units is a quantum dot display unit, and a reflectance of the light-reflecting wall to light in a first wavelength range is greater than a preset threshold.

In some embodiments of the present disclosure, the preset threshold is 80%.

In some embodiments of the present disclosure, the light-reflecting wall includes: a light-transmissive wall; and a light-reflecting layer covering the light-transmissive wall, where a reflectance of the light-reflecting layer to the light in the first wavelength range is greater than the preset threshold.

In some embodiments of the present disclosure, the light-reflecting layer includes at least one first refractive film and at least one second refractive film, the first refractive film and the second refractive film are arranged alternately in a stacked manner, a refractive index of the first refractive film and a refractive index of the second refractive film are different, and materials of the first refractive film and the second refractive film are selected from $TiO_2$, $SiO_2$, SiNx or SiNO.

In some embodiments of the present disclosure, the first refractive film is made of $TiO_2$, the second refractive film is made of $SiO_2$, and the light-reflecting layer includes: 4 first refractive films and 3 second refractive films; or, 5 first refractive films and 4 second refractive films; or, 6 first refractive films and 5 second refractive films; or, 7 first refractive films and 6 second refractive films.

In some embodiments of the present disclosure, one of the at least two adjacent display units is a quantum dot display unit, and another of the at least two adjacent display units is a light-transmissive unit; or, the at least two adjacent display units are all quantum dot display units.

In some embodiments of the present disclosure, the light-reflecting wall is provided between every two adjacent display units of the multiple display units.

In some embodiments of the present disclosure, in a case that the reflectance of the light-reflecting wall to blue light is greater than the preset threshold, the multiple display units include a red light quantum dot display unit for emitting red light, a green light quantum dot display unit for emitting green light, and a light-transmissive unit for transmitting blue light; or, in a case that the reflectance of the light-reflecting wall to green light is greater than the preset threshold, the multiple display units include a red light quantum dot display unit for emitting red light, a blue light quantum dot display unit for emitting blue light, and a light-transmissive unit for transmitting green light; or, in a case that the reflectance of the light-reflecting wall to red light is greater than the preset threshold, the multiple display units include a green light quantum dot display unit for emitting green light, a blue light quantum dot display unit for emitting blue light, and a light-transmissive unit for transmitting red light.

In some embodiments of the present disclosure, the light-reflecting wall is at a side of the black matrix pattern away from the base substrate.

In some embodiments of the present disclosure, the black matrix pattern includes multiple light-shielding units, and an area of an orthographic projection of the light-reflecting wall onto the base substrate is less than or equal to an area of an orthographic projection of the light-shielding unit onto the base substrate.

In some embodiments of the present disclosure, the black matrix pattern includes multiple light-shielding units, and an area of an orthographic projection of the light-reflecting wall onto the base substrate is greater than an area of an orthographic projection of the light-shielding unit onto the base substrate.

In some embodiments of the present disclosure, a material of the light-transmissive wall is resin.

In some embodiments of the present disclosure, a distance between a top surface of the light-reflecting wall and the base substrate is not less than a distance between a top surface of the display unit and the base substrate, the top surface of the light-reflecting wall is a surface of the light-reflecting wall away from the base substrate, and the top surface of the display unit is a surface of the display unit away from the base substrate.

A method for manufacturing a display substrate is further provided according to some embodiments of the present disclosure, including: forming a black matrix pattern and multiple display units on a base substrate, where the multiple display units are respectively in multiple regions defined by the black matrix pattern; and forming a light-reflecting wall between at least two adjacent display units, where at least one display unit of the at least two display units is a quantum dot display unit, and a reflectance of the light-reflecting wall to light in a first wavelength range is greater than a preset threshold.

In some embodiments of the present disclosure, forming the light-reflecting wall between the at least two adjacent display units includes: forming a light-transmissive wall at a side of the black matrix pattern away from the base substrate; and forming a light-reflecting layer covering the light-transmissive wall at the side of the black matrix pattern away from the base substrate, where a reflectance of the light-reflecting layer to the light in the first wavelength range is greater than the preset threshold.

In some embodiments of the present disclosure, forming the light-reflecting layer covering the light-transmissive wall including: forming at least one first refractive film and at least one second refractive film, where the first refractive film and the second refractive film are arranged alternately in a stacked manner, and a refractive index of the first refractive film and a refractive index of the second refractive film are different.

A display device is further provided according to some embodiments of the present disclosure, including the display substrate as described above.

In some embodiments of the present disclosure, the display device further includes: an array substrate opposite to the display substrate; a liquid crystal layer between the display substrate and the array substrate; and a backlight module at a side of the array substrate away from the display substrate; where the liquid crystal layer is at a light-emitting side of the backlight module, the light of the first wave band is blue light, and the backlight module is a blue light backlight module.

In some embodiments of the present disclosure, the display device further includes: a first polarizer between the array substrate and the backlight module; and a second polarizer between the liquid crystal layer and the display substrate, where a direction of a light transmission axis of the second polarizer is perpendicular to a direction of a light transmission axis of the first polarizer.

In some embodiments of the present disclosure, the second polarizer is a wire grip polarizer having a period in a range of 80 to 140 nm, a duty ratio in a range of 0.4 to 0.6 and a depth-to-width ratio in a range of 2:1 to 3:1.

DETAILED DESCRIPTION

In order that technical problems to be solved, technical solutions and advantages of embodiments of the present disclosure can be clearer, detailed descriptions are provided hereinafter in conjunction with the drawings and embodiments.

Figure 1:
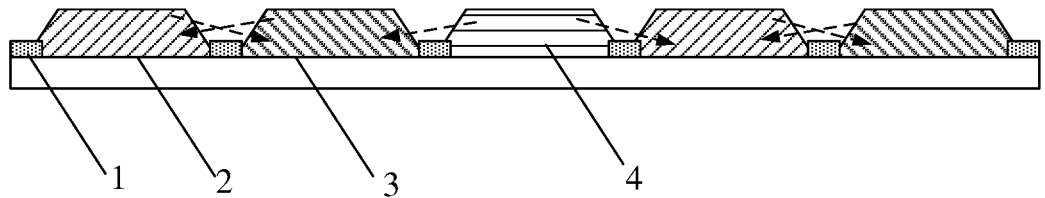
FIG. 1 is a schematic diagram of a quantum dot display substrate in related technologies.

FIG. 1 is a schematic diagram of a quantum dot display substrate in the related technologies. As shown in FIG. 1, the quantum dot display substrate in the related technologies includes a black matrix pattern 1 and multiple quantum dot display units (including a red light quantum dot display unit 2 and a green light quantum dot display unit 3) located on a base substrate. The quantum dot display units are located in light-emitting regions defined by the black matrix pattern 1. When being excited by blue light, the quantum dot display units can emit monochromatic light with different colors. The quantum dot display substrate further includes a light-transmissive unit 4 for transmitting the blue light. As shown in FIG. 1, when the light-transmissive unit 4 is lightened, the blue light transmitted from the light-transmissive unit 4 reaches the adjacent red light quantum dot display unit 2 and the adjacent green light quantum dot display unit 3, and the adjacent red light quantum dot display unit 2 and the adjacent green light quantum dot display unit 3 are excited to emit light. Or, when the red light quantum dot display unit 2 or the green light quantum dot display unit 3 is lightened, as an absorption rate of blue light by the red light quantum dot display unit 2 and the green light quantum dot display unit 3 is difficult to reach 100%, a small amount of unabsorbed blue light enters adjacent pixels to excite the adjacent quantum dot display units to emit light, resulting in mixed color and cross color.

To address the above issue, embodiments of the present disclosure provides a display substrate, a method for manufacturing the same and a display device, which can prevent color mixing caused by false excitation among display units, and can greatly improve color gamut and contrast of a display device.

Some embodiments of the present disclosure provide a display substrate, including: a base substrate; a black matrix pattern on the base substrate; and multiple display units respectively located in multiple regions defined by the black matrix pattern. The display substrate further includes: a light-reflecting wall between at least two adjacent display units, at least one of the at least two adjacent display units is a quantum dot display unit, and a reflectance of the light-reflecting wall to light in a first wavelength range is larger than a preset threshold. The light-reflecting wall may be in contact with the adjacent display units.

In the embodiments, the light-reflecting wall is provided between the adjacent display units, the reflectance of the light-reflecting wall to light in the first wavelength range is larger than the preset threshold. In this way, light in the first wavelength range which is not completely absorbed by the display units can be effectively prevented from being incident into the adjacent display units, and hence light in the first wavelength range which is not completely absorbed by the display units is prevented from exciting the adjacent display units to emit light, avoiding color mixing caused by false excitation among the display units, and greatly improving color gamut and contrast of a display device.

In the embodiments of the present disclosure, the quantum dot display unit includes a display unit which is provided with a quantum dot.

The light in the first wavelength range includes, but is not limited to, red light, yellow light, green light, blue light, or violet light, and for the sake of description, a case where the light in the first wavelength range is blue light (which generally has a wavelength range of 380 to 460 nm) is taken as an example hereinafter. That is, in the following embodiments of the display substrate, descriptions are provided with an example in which the reflectance of the light-reflecting wall to the blue light is greater than the preset threshold. In some other embodiments, the reflectance of the light-reflecting wall to light in other wavelength ranges may be greater than the preset threshold.

In the embodiments of the present disclosure, since the display unit may include the quantum dot display unit, the display substrate may also be referred to as a quantum dot display substrate.

The light-reflecting wall reflects the blue light, so that the blue light which is not completely absorbed by the quantum dot display units can be reflected back to the quantum dot display units by the light-reflecting wall after the blue light is incident on the light-reflecting wall, and then continue to excite the quantum dot display units to emit light, thus improving utilization rate of the blue light. Since the quantum dot display units emit light under the excitation of blue light, the light-reflecting wall only needs to reflect the blue light. The light-reflecting wall may also reflect light of other wavelength ranges.

The preset threshold may be 80%, i.e., the reflectance of the light-reflecting wall to the blue light is more than 80%, in which way most of the blue light incident on the light-reflecting wall can be reflected back to the quantum dot display units to continue to excite quantum dot display units to emit light, greatly improving utilization rate of the blue light.

The greater the height of the light-reflecting wall is, the more the blue light is reflected. In some embodiments, a distance between a top surface of the light-reflecting wall and the base substrate is not less than a distance between a top surface of the display unit and the base substrate. The height of the light-reflecting wall may not be set too large, since the higher the height of the light-reflecting wall is, the higher the cost of the quantum dot display substrate becomes. The distance between the top surface of the light-reflecting wall and the base substrate may be set to be equal to the distance between the top surface of the display unit and the base substrate, and color mixing caused by false excitation among quantum dot display units can be effectively prevented as long as the distance between the top surface of the light-reflecting wall and the base substrate is not less than the distance between the top surface of the display unit and the base substrate. The top surface of the light-reflecting wall is a surface of the light-reflecting wall away from the base substrate, and the top surface of the display unit is a surface of the display unit away from the base substrate.

The blue light may be reflected by a light-reflecting structure formed by multiple layers of refractive films which are arranged in a stacked manner. A thickness of the quantum dot display unit is relatively large and may reach the order of micrometers (generally 5 to 6 micrometers), and a thickness of the refractive film is generally small and may reach the order of nanometers. If the light-reflecting wall is merely formed by multiple layers of refractive films, tens or even hundreds of layers of refractive films are needed, which has a high requirement on process. As a result, a light-transmissive wall may be provided in the internal of the light-reflecting wall, and multiple layers or tens of layers of refractive films are covered on the light-transmissive wall to form the light-reflecting wall, which can greatly lower the requirement on process.

In some embodiments, the light-reflecting wall includes: a light-transmissive wall; and a light-reflecting layer covering the light-transmissive wall, where a reflectance of the light-reflecting layer to blue light is greater than the preset threshold.

In some embodiments, the light light-reflecting layer includes at least one first refractive film and at least one second refractive film, the first refractive film and the second refractive film are arranged alternately in a stacked manner, and refractive indices of the first refractive film and the second refractive film are different. Materials of the first refractive film and the second refractive film may be selected from $TiO_2$, $SiO_2$, SiNx or SiNO. By adjusting thicknesses of the first refractive film and the second refractive film, the reflectance of the light-reflecting layer to blue light can be adjusted. The materials of the first refractive film and the second refractive film are not limited to $TiO_2$, $SiO_2$, SiNx or SiNO, and materials with other refractive indices can be used.

In some embodiments, the first refractive film adopts $TiO_2$ and the second refractive film adopts $SiO_2$, and the light-reflecting layer includes:

four first refractive films and three second refractive films; or five first refractive films and four second refractive films; or six first refractive films and five second refractive films; or seven first refractive films and six second refractive films.

Figure 3:
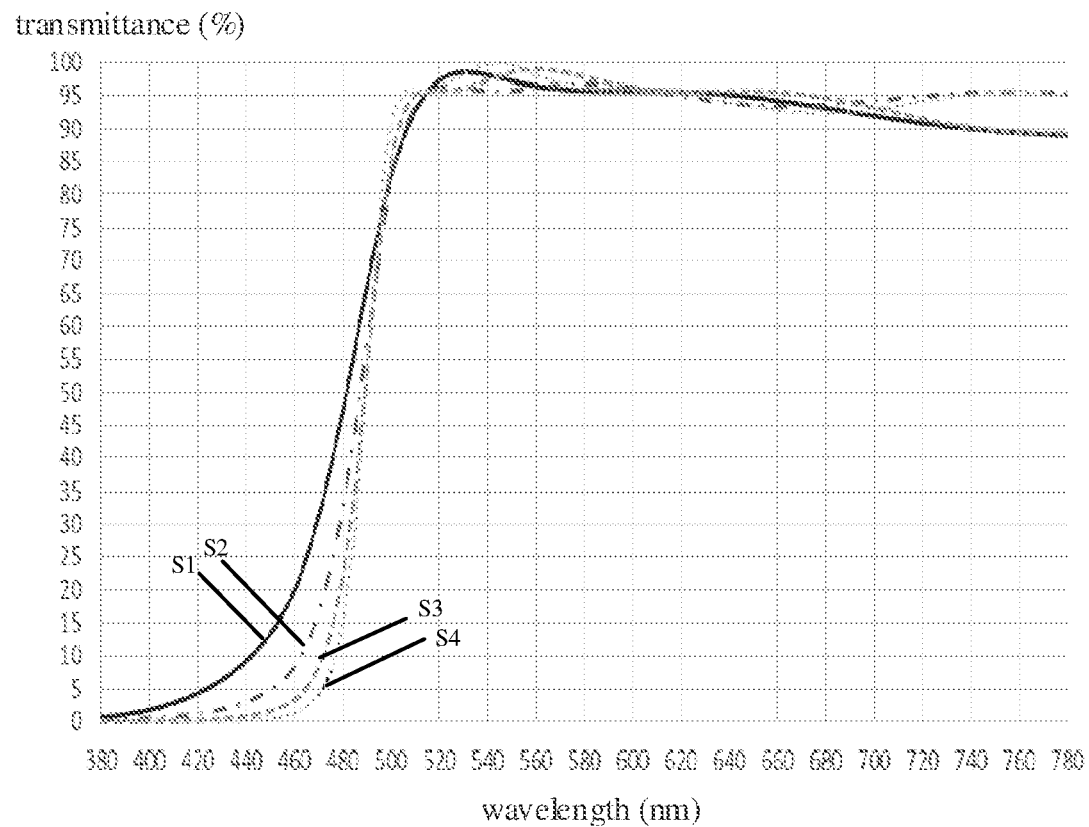
FIG. 3 is a schematic diagram of light transmittance curves of light-reflecting layers having different quantities of layers according to some embodiments of the present disclosure.

When the first refractive film adopts $TiO_2$, the second refractive film adopts $SiO_2$, and the light-reflecting layer includes four first refractive films and three second refractive films, a thickness of the first layer of $TiO_2$ may be 14.44 nanometers (nm), a thickness of the second layer of $SiO_2$ may be 66.27 nm, a thickness of the third layer of $TiO_2$ may be 28.89 nm, a thickness of the fourth layer of $SiO_2$ may be 66.27 nm, and a thickness of the fifth layer of $TiO_2$ may be 28.89 nm, a thickness of the sixth layer of $SiO_2$ may be 66.27 nm, and a thickness of the seventh layer of $TiO_2$ may be 14.44 nm. FIG. 3 is a schematic diagram showing light transmittance curves of light-reflecting layers having different quantities of layers in the embodiments of the present disclosure, S1 is a light transmittance curve of the light-reflecting layer including 7 layers of the refractive films, and it can be seen that according to the structural design, the reflectance of the light-reflecting layer to blue light (the wavelength range is 380 to 460 nm) can reach more than 80%.

When the first refractive film adopts $TiO_2$, the second refractive film adopts $SiO_2$, and the light-reflecting layer includes five first refractive films and four second refractive films, a thickness of the first layer of $TiO_2$ may be 14.44 nm, a thickness of the second layer of $SiO_2$ may be 66.27 nm, a thickness of the third layer of $TiO_2$ may be 28.89 nm, a thickness of the fourth layer of $SiO_2$ may be 66.27 nm, a thickness of the fifth layer of $TiO_2$ may be 28.89 nm, a thickness of the sixth layer of $SiO_2$ may be 66.27 nm, a thickness of the seventh layer of $TiO_2$ may be 28.89 nm, a thickness of the eighth layer of $SiO_2$ may be 66.27 nm, and a thickness of the ninth layer of $TiO_2$ may be 14.44 nm. FIG. 3 is a schematic diagram showing light transmittance curves of light-reflecting layers having different quantities of layers in the embodiments of the present disclosure, 52 is a light transmittance curve of the light-reflecting layer including 9 layers of the refractive films, and it can be seen that according to the structural design, the reflectance of the light-reflecting layer to blue light (the wavelength range is 380 to 460 nm) can reach more than 90%.

When the first refractive film adopts $TiO_2$, the second refractive film adopts $SiO_2$, and the light-reflecting layer includes six first refractive films and five second refractive films, a thickness of the first layer of $TiO_2$ may be 14.44 nm, a thickness of the second layer of $SiO_2$ may be 66.27 nm, a thickness of the third layer of $TiO_2$ may be 28.89 nm, a thickness of the fourth layer of $SiO_2$ may be 66.27 nm, and a thickness of the fifth layer of $TiO_2$ may be 28.89 nm; a thickness of the sixth layer of $SiO_2$ may be 66.27 nm, a thickness of the seventh layer of $TiO_2$ may be 28.89 nm, a thickness of the eighth layer of $SiO_2$ may be 66.27 nm, a thickness of the ninth layer of $TiO_2$ may be 28.89 nm, a thickness of the tenth layer of $SiO_2$ may be 66.27 nm, and a thickness of the eleventh layer of $TiO_2$ may be 14.44 nm. FIG. 3 is a schematic diagram showing light transmittance curves of light-reflecting layers having different quantities of layers in the embodiments of the present disclosure, S3 is a light transmittance curve of the light-reflecting layer including 11 layers of the refractive films, and it can be seen that according to the structural design, the reflectance of the light-reflecting layer to blue light (the wavelength range is 380 to 460 nm) can reach more than 93%.

When the first refractive film adopts $TiO_2$, the second refractive film adopts $SiO_2$, and the light-reflecting layer includes 7 first refractive films and 6 second refractive films, a thickness of the first layer of $TiO_2$ may be 14.44 nm, a thickness of the second layer of $SiO_2$ may be 66.27 nm, a thickness of the third layer of $TiO_2$ may be 28.89 nm, a thickness of the fourth layer of $SiO_2$ may be 66.27 nm, a thickness of the fifth layer of $TiO_2$ may be 28.89 nm, a thickness of the sixth layer of $SiO_2$ may be 66.27 nm, a thickness of the seventh layer of $TiO_2$ may be 28.89 nm, a thickness of the eighth layer of $SiO_2$ may be 66.27 nm, a thickness of the ninth layer of $TiO_2$ may be 28.89 nm, a thickness of the tenth layer of $SiO_2$ may be 66.27 nm, a thickness of the eleventh layer of $TiO_2$ may be 28.89 nm, a thickness of the twelfth layer of $SiO_2$ may be 66.27 nm, and a thickness of the thirteenth layer of $TiO_2$ may be 14.44 nm. FIG. 3 is a schematic diagram showing light transmittance curves of light-reflecting layers having different quantities of layers in the embodiments of the present disclosure, S4 is a light transmittance curve of the light-reflecting layer including 13 layers of the refractive films, and it can be seen that according to the structural design, the reflectance of the light-reflecting layer to blue light (the wavelength range is 380 to 460 nm) can reach more than 95%.

As can be seen from FIG. 3, the transmittances and the reflectances of the refractive films with different layers to the blue light are different, and reflection efficiency of the light-reflecting layer to the blue light can reach a relatively high value by adjusting the thickness of each layer of the refractive film. In addition, as the quantity of layers increases, the light transmittance for blue light is reduced, the reflectance to the blue light is increased (it should be noted that for each of the light-reflecting layers illustrated in FIG. 3, the absorbance to blue light can generally be designed to be low, e.g., less than 5%), and there is a change in the composition of the reflected blue light spectrum.

Figure 2A:
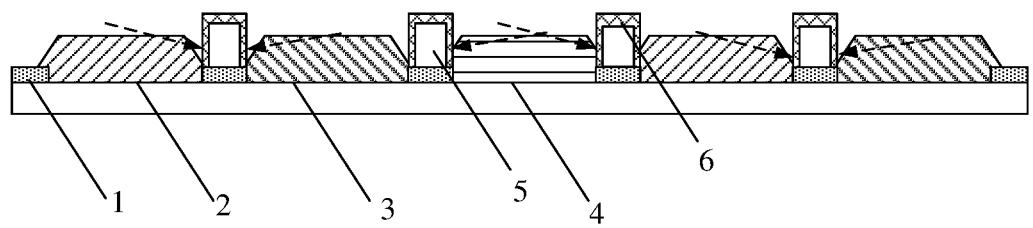
FIG. 2(a) is a schematic diagram of a quantum dot display substrate according to some embodiments of the present disclosure.
Figure 2B:
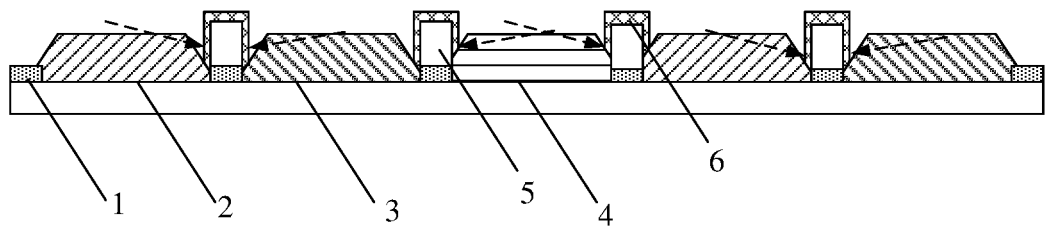
FIG. 2(b) is a schematic diagram of a quantum dot display substrate according to some embodiments of the present disclosure.
Figure 2C:
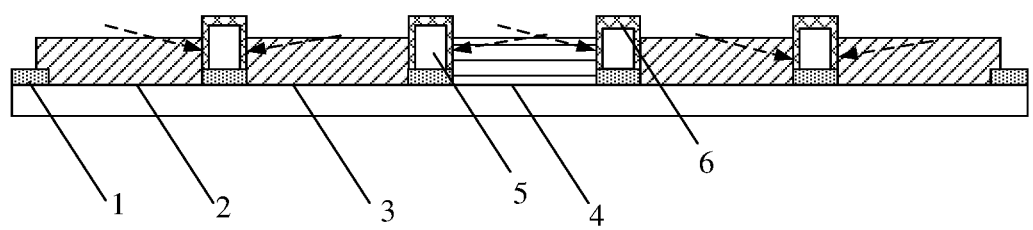
FIG. 2(c) is a schematic diagram of a quantum dot display substrate according to some embodiments of the present disclosure.

In some embodiments, as shown in FIGS. 2(a) to 2(c), the quantum dot display substrate includes: a black matrix pattern 1 and multiple quantum dot display units on a base substrate, the multiple quantum dot display units includes a red light quantum dot display unit 2 and a green light quantum dot display unit 3. The quantum dot display units are arranged in regions defined by the black matrix pattern 1. When being excited by blue light, the quantum dot display units can emit monochromatic light with different colors. The quantum dot display substrate may further include a light-transmissive unit 4 for transmitting the blue light. As shown in FIG. 2, light-reflecting walls are arranged between adjacent quantum dot display units and between the quantum dot display unit and the light-transmissive unit 4, and the light-reflecting wall includes a light light-transmissive wall 5 and a light-reflecting layer 6 covering the light-transmissive wall 5. When the light-transmissive unit 4 is lightened, the blue light transmitted from the light-transmissive unit 4 is incident on the light-reflecting wall and reflected by the light-reflecting wall, and will not be incident on the quantum dot display units adjacent to the light-transmissive unit 4, so that the adjacent quantum dot display units will not be mistakenly excited. In addition, when the red light quantum dot display unit 2 or the green light quantum dot display unit 3 is lightened, as an absorption rate of blue light by the red light quantum dot display unit 2 and the green light quantum dot display unit 3 is difficult to reach 100%, the blue light which is not completely absorbed by the red light quantum dot display unit 2 or the green light quantum dot display unit 3 is incident on the light-reflecting wall and is reflected by the light-reflecting wall, and will not be incident on the quantum dot display units adjacent to the red light quantum dot display unit 2 or the green light quantum dot display unit 3, so that the adjacent quantum dot display units will not be excited by mistake, in which way color mixing phenomenon can be eliminated and color gamut and contrast ratio of a display product can be improved.

Figure 8:
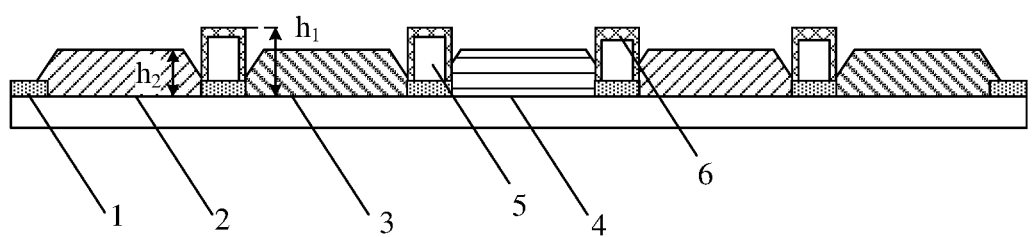
FIG. 8 is a schematic diagram of a quantum dot display substrate according to some embodiments of the present disclosure.

As shown in FIG. 8, the distance $h_1$ between the top surface of the light-reflecting wall and the base substrate may be greater than or equal to the distance $h_2$ between the top surface of the display unit and the base substrate.

In the embodiments of the present disclosure, the light-transmissive unit 4 includes a display unit which is not provided with a quantum dot but is provided with a transparent resin or a color film.

In some embodiments of the present disclosure, the light-transmissive unit 4 on the quantum dot display substrate may be replaced by a blue light quantum dot display unit for emitting blue light, that is, the quantum dot display substrate is provided with the red light quantum dot display unit for emitting red light, the green light quantum dot display unit for emitting green light, and the blue light quantum dot display unit for emitting blue light. When any of the quantum dot display units is excited, blue light which is not completely absorbed by the quantum dot display unit is incident on the light-reflecting wall and reflected by the light-reflecting wall, and will not be incident on the adjacent quantum dot display units, so that the adjacent quantum dot display units will not be excited by mistake, in which way color mixing phenomenon can be eliminated and color gamut and contrast of a display product can be improved.

As described above, descriptions are provided hereinabove in conjunction with an example where the reflectance of the light-reflecting wall to blue light is greater than the preset threshold, and in other embodiments, the reflectance the light-reflecting wall to light in other wavelength ranges may be greater than the preset threshold.

For example, when the reflectance of the light-reflecting wall to green light is greater than the preset threshold, the multiple quantum dot display units include a red light quantum dot display unit for emitting red light and a blue light quantum dot display unit for emitting blue light, the quantum dot display substrate further includes a light-transmissive unit for transmitting green light, and the light-reflecting wall is arranged between the light-transmissive unit and the adjacent quantum dot display unit. For another example, when the reflectance of the light-reflecting wall to red light is larger than the preset threshold, the multiple quantum dot display units include a green light quantum dot display unit for emitting green light and a blue light quantum dot display unit for emitting blue light, the quantum dot display substrate further includes a light-transmissive unit for transmitting red light, and the light-reflecting wall is arranged between the light-transmissive unit and the adjacent quantum dot display unit. Similarly, in these examples, the effects of avoiding false excitations and/or achieving recycling of light can also be achieved, which will not be described in detail herein.

Embodiments of the present disclosure further provide a method for manufacturing the display substrate, which includes:

forming a black matrix pattern and multiple display units on a base substrate, where the multiple display units are respectively arranged in multiple regions defined by the black matrix pattern;

forming a light-reflecting wall between at least two adjacent display units, where at least one of the at least two adjacent display units is a quantum dot display unit, and a reflectance of the light-reflecting wall to light in a first wavelength range is larger than a preset threshold.

In the embodiments, the light-reflecting wall is provided between adjacent display units, the reflectance of the light-reflecting wall to light in the first wavelength range is larger than the preset threshold. In this way, light in the first wavelength range which is not completely absorbed by the display units can be effectively prevented from being incident into the adjacent quantum dot display units, and hence light in the first wavelength range which is not completely absorbed by the display units is prevented from exciting the adjacent display units to emit light, avoiding color mixing caused by false excitation among the display units, and greatly improving color gamut and contrast of a display device.

For the sake of description, the following description is made with an example in which the reflectance of blue light by the light-reflecting wall is greater than the preset threshold. Since display unit may include the quantum dot display unit, the display substrate may also be referred to as a quantum dot display substrate.

The light-reflecting wall reflects the blue light, so that the blue light which is not completely absorbed by the quantum dot display unit can be reflected back to the quantum dot display unit by the light-reflecting wall after the blue light is incident on the light-reflecting wall, and then continue to excite the quantum dot display units to emit light, thus improving utilization rate of the blue light. Since the quantum dot display unit only emits light under the excitation of blue light, the light-reflecting wall only needs to reflect the blue light. The light-reflecting wall may also reflect light of other wavelength ranges.

The preset threshold may be 80%, i.e., the reflectance of the light-reflecting wall to the blue light is more than 80%, in which way most of the blue light incident on the light-reflecting wall can be reflected back to the quantum dot display units to continue to excite quantum dot display units to emit light, greatly improving utilization rate of the blue light.

The greater the height of the light-reflecting wall is, the more the blue light is reflected. In some embodiments, a distance between a top surface of the light-reflecting wall and the base substrate is not less than a distance between a top surface of the display unit and the base substrate. The height of the light-reflecting wall may not be set too large, since the higher the height of the light-reflecting wall is, the higher the cost of the quantum dot display substrate becomes. The distance between the top surface of the light-reflecting wall and the base substrate may be set to be equal to the distance between the top surface of the display unit and the base substrate, and color mixing caused by false excitation among quantum dot display units can be effectively prevented as long as the distance between the top surface of the light-reflecting wall and the base substrate is not smaller than the distance between the top surface of the display unit and the base substrate. The top surface of the light-reflecting wall is a surface of the light-reflecting wall away from the base substrate, and the top surface of the display unit is a surface of the display unit away from the base substrate.

The blue light may be reflected by a light-reflecting structure formed by multiple layers of refractive films which are arranged in a stacked manner. A thickness of the quantum dot display unit is relatively large and may reach the order of micrometers (generally 5 to 6 micrometers), and a thickness of the refractive film is generally small and may reach the order of nanometers. If the light-reflecting wall is merely formed by multiple layers of refractive films, tens or even hundreds of layers of refractive films are needed, which has a high requirement on process. As a result, a light-transmissive wall may be provided in the internal of the light-reflecting wall, and multiple layers or tens of layers of refractive films are covered on the light-transmissive wall to form the light-reflecting wall, which can greatly lower the requirement on process.

In some embodiments, the light-reflecting wall may include: a light-transmissive wall; a light-reflecting layer covering the light-transmissive wall, where a reflectance of the light-reflecting layer to blue light is greater than the preset threshold.

Figure 4A:
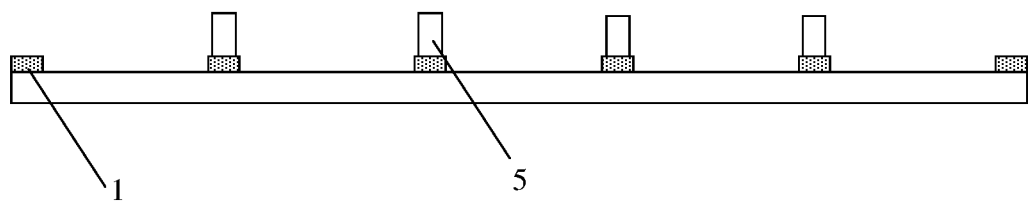
FIG. 4(a) is a schematic diagram of a light-transmissive wall as formed according to some embodiments of the present disclosure.

As shown in FIG. 4 (a), when manufacturing the quantum dot display substrate, a light-transmissive wall 5 with a certain height (5 to 6 micrometers (μm)) may be formed on the base substrate on which the black matrix pattern 1 is formed, the light-transmissive wall 5 may be located at a side of the black matrix pattern away from the base substrate, and the light-transmissive wall 5 may be made of resin. Then, as shown in FIG. 5 (a), a light-reflecting layer 6 covering the light-transmissive wall 5 is formed on the light-transmissive wall 5, the light-reflecting layer 6 may be located at a side of the black matrix pattern away from the base substrate, and the quantity of layers of refractive films included in the light-reflecting layer 6 may be set according to actual requirements. Quantum dot display units and/or light-transmissive units are formed in regions defined by the black matrix pattern 1 to obtain the quantum dot display substrate of the embodiments. The quantum dot display units and the light-transmissive units may be manufactured through a photolithography process. As shown in FIGS. 2(a) and 5(a), the light-reflecting wall is located on the black matrix pattern 1, the black matrix pattern 1 may include multiple light-shielding units 11, and an area of an orthographic projection of the light-reflecting wall onto the base substrate is less than or equal to an area of an orthographic projection of the light-shielding unit 11 onto the base substrate.

Figure 4B:
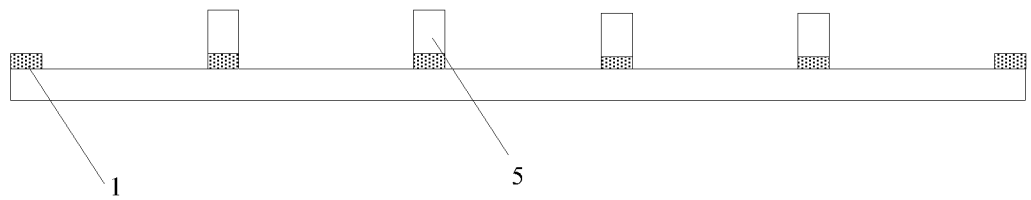
FIG. 4(b) is a schematic diagram of a light-transmissive wall as formed according to some embodiments of the present disclosure.
Figure 5A:
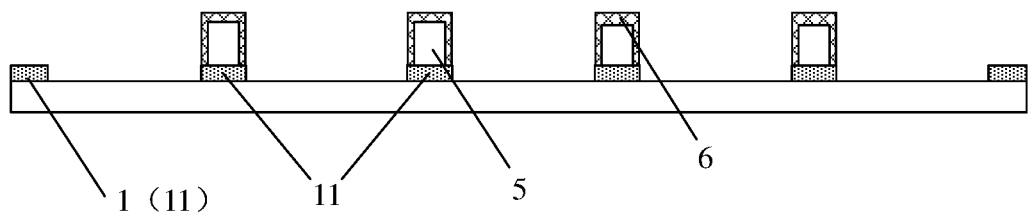
FIG. 5(a) is a schematic diagram of a light-reflecting layer as formed according to some embodiments of the present disclosure.
Figure 5B:
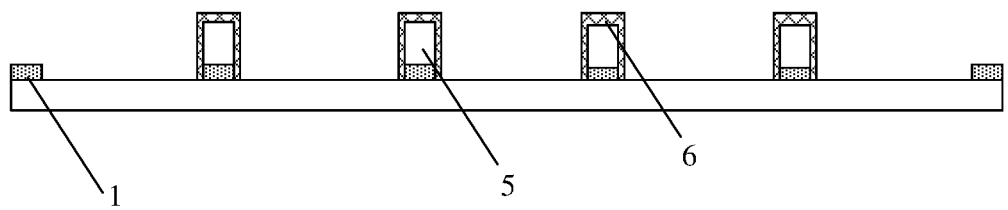
FIG. 5(b) is a schematic diagram of a light-reflecting layer as formed according to some embodiments of the present disclosure.

In some embodiments of the present disclosure, as shown in FIGS. 2(b), 4(b) and 5(b), an area of an orthographic projection of the light-transmissive wall 5 onto the base substrate is equal to an area of an orthographic projection of the light-shielding unit 11 onto the base substrate, and the light-reflecting layer 6 covers the light-transmissive wall 5 and the light-shielding unit 11. That is, the area of the orthographic projection of the light-reflecting wall onto the base substrate is greater than the area of the orthographic projection of the light-shielding unit 11 onto the base substrate.

It is to be noted that the drawings of the present disclosure merely illustrate some examples of the present disclosure and the present disclosure is not limited thereto. For example, as shown in FIGS. 2(a) and 2(b), the display unit has a trapezoidal cross section; in addition, as shown in FIG. 2(c), the display unit may have a rectangular cross section; the display unit may have a cross section of other shapes, which will not be described in detail herein. It will be appreciated that during actual manufacture, due to small thicknesses of some structures (such as the light-reflecting layer and the black matrix pattern) of the display substrate, there may be partial overlay between structures, and the cross section of the finally formed display unit may not be a standard trapezoid or rectangle, and may be approximate to a trapezoid or rectangle.

Some embodiments of the present disclosure further provide a display device, including the display substrate as described above. The display device may be television, displayer, digital photo frame, mobile phone, tablet computer or any other products or components with display function. The display device further includes a flexible circuit board, a printed circuit board and a back plate.

In the embodiments, the light-reflecting wall is provided between the adjacent display units, the reflectance of the light-reflecting wall to light in the first wavelength range is larger than the preset threshold. In this way, light in the first wavelength range which is not completely absorbed by the display units can be effectively prevented from being incident into the adjacent display units, and hence light in the first wavelength range which is not completely absorbed by the display units is prevented from exciting the adjacent display units to emit light, avoiding color mixing caused by false excitation among the display units, and greatly improving color gamut and contrast of the display device.

Specifically, the light in the first wavelength range may be blue light, and since the display unit may include the quantum dot display unit, the display substrate may also be referred to as a quantum dot display substrate.

Figure 6:
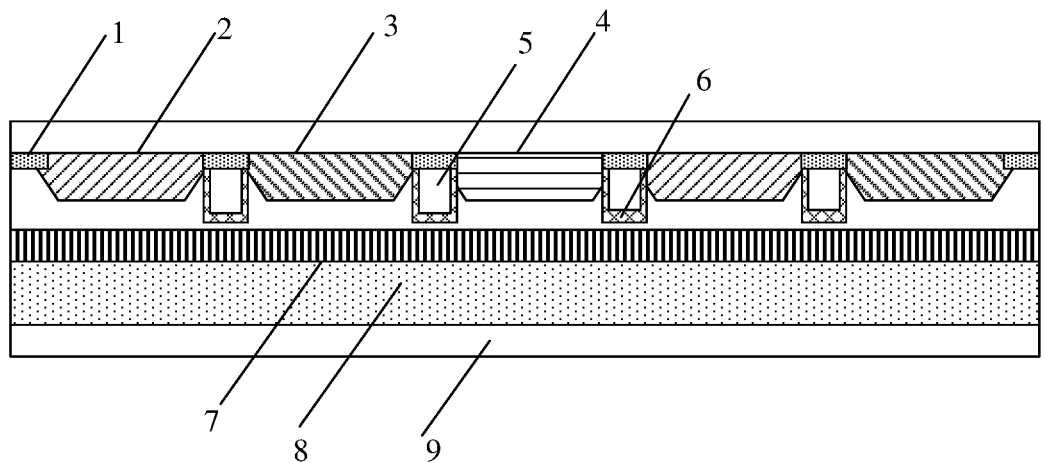
FIG. 6 is a schematic diagram of a display device according to some embodiments of the present disclosure.

In some embodiments of the present disclosure, as shown in FIG. 6, the display device further includes:
a blue light backlight module 9; and
a liquid crystal layer 8 at a light-emitting side of the blue light backlight module 9.

The quantum dot display substrate is located at a side of the liquid crystal layer 8 away from the blue light backlight module 9.

The blue light backlight module 9 provides blue light for exciting the quantum dot units to emit light, and the liquid crystal layer 8 is for controlling brightness of the blue light.

In some embodiments of the present disclosure, the display device further includes:
a first polarizer between the liquid crystal layer and the blue light backlight module; and
a second polarizer between the liquid crystal layer and the quantum dot display substrate, where a direction of a light transmission axis of the second polarizer is perpendicular to a direction of a light transmission axis of the first polarizer.

The first polarizer and the second polarizer can be used for modulating polarization state so as to control gray scale, and since light emitted by the quantum dot display units is unpolarized light, the second polarizer needs to be arranged at a light incident side of the quantum dot display substrate.

As shown in FIG. 6, a wire grip polarizer (WGP) 7 may be adopted as the second polarizer to selectively transmit polarization state of light. In some embodiments, the wire grip polarizer has a period of 80 to 140 nm, a duty ratio of 0.4 to 0.6, and a depth-to-width ratio of 2:1 to 3:1. The wire grip polarizer may be manufactured by adopting a nano imprinting process, for example, after a metal layer (which may be a layer of Al) is deposited, a layer of imprinting resist is coated, a wire grip microstructure is transferred to the imprinting resist through nano imprinting technology, and after solidification, the metal layer is etched into a wire grip shape through an etching process.

Figure 7:
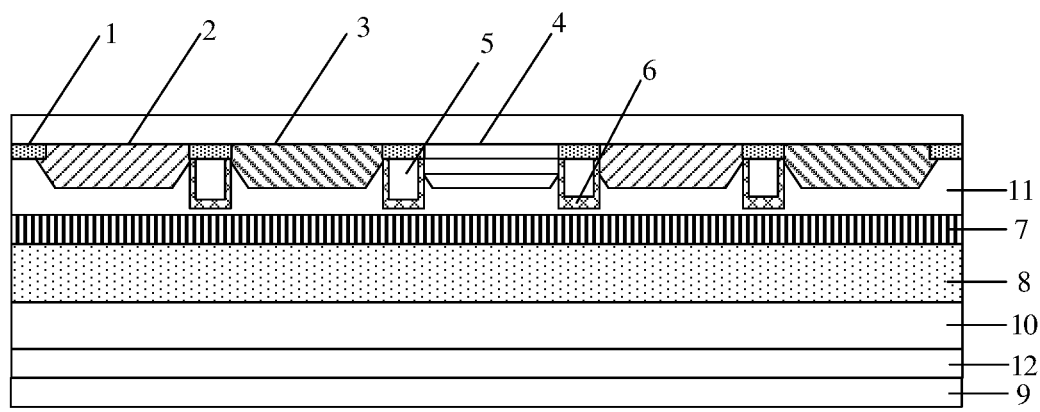
FIG. 7 is a schematic diagram of a display device according to some embodiments of the present disclosure.

As shown in FIG. 7, in some embodiments of the present disclosure, the display device may further include: an array substrate 10 between the liquid crystal layer and the blue light backlight module, and a planarization layer 11 between the light-reflecting layer 6 and the second polarizer 7. The first polarizer 12 is located between the array substrate and the blue light backlight module.

In the above embodiments of the display device, description is provided in conjunction with an example in which the reflectance of the light-reflecting wall to blue light is greater than the preset threshold, and in some other embodiments, the reflectance of the light-reflecting wall to light in other wavelength ranges may be greater than the preset threshold. For example, when the reflectance of the light-reflecting wall to green light is larger than the preset threshold, the blue light backlight module is replaced by a green light backlight module. For another example, when the reflectance of the light-reflecting wall to red light is larger than the preset threshold, the blue light backlight module is replaced by a red light backlight module.

Unless otherwise defined, technical terms or scientific terms used in the present disclosure shall have common meanings understood by the ordinary skilled in the art. Terms such as "first" and "second" in the present disclosure do not indicate any order, quantity or importance, and they are merely used to distinguish different components. Terms such as "include" or "contain" indicate that an element or object before such terms covers an element, an object or the equivalent enumerated after such terms, and do not exclude other elements and objects. Terms such as "coupled" and "connected" are not used to limit physical or mechanical connection, they may be direct or indirect electrical connection. Terms such as "above", "below", "left" and "right" are merely to describe relative position relationships, and if an absolute position of a described object changes, relative positions with respect to the described object may change correspondingly.

It can be understood that, if an element such as a layer, a film, a region or a substrate is described to be on or below another element, the element may be directly on or below the other element, or there may be an intermediate element between the element and the other element.

Specific features, structures, materials and characteristics in descriptions of the above implementations may be combined properly in one or more embodiments or examples.

The above descriptions illustrate some embodiments of the present disclosure. It should be noted that various improvements and modifications may be made by those skilled in the art without departing from the principle of the present disclosure, and these improvements and modifications shall also fall within the protection scope of the present disclosure

What is claimed is:

1. A display substrate, comprising:
a base substrate;
a black matrix pattern on the base substrate;
a plurality of display units respectively in a plurality of regions defined by the black matrix pattern; and
a light-reflecting wall between at least two adjacent display units, wherein at least one display unit of the at least two adjacent display units is a quantum dot display unit,
wherein the light-reflecting wall comprises:
a light-transmissive wall; and
a light-reflecting layer covering a top surface and side surfaces of the light-transmissive wall, wherein a reflectance of the light-reflecting layer to the light in the first wavelength range is greater than the preset threshold;
wherein the light-reflecting layer comprises a plurality of first refractive films and a plurality of second refractive films, the first refractive films and the second refractive films are arranged alternately in a stacked manner, a refractive index of the first refractive films and a refractive index of the second refractive films are different, and the first refractive films are made of TiO2 and the second refractive films are made of SiO2;
wherein the light-reflecting layer comprises:
4 first refractive films and 3 second refractive films; or
5 first refractive films and 4 second refractive films; or
6 first refractive films and 5 second refractive films; or
7 first refractive films and 6 second refractive films; and
wherein a thickness of the first refractive films and a thickness of the second refractive films are set such that a reflectance of the light-reflecting layer to light in a first wavelength range is greater than a preset threshold of 80%.

2. The display substrate according to claim 1, wherein:
a first one of the at least two adjacent display units is a quantum dot display unit, and a second one of the at least two adjacent display units is a light-transmissive unit; or
the at least two adjacent display units are all quantum dot display units.

3. The display substrate according to claim 1, wherein the light-reflecting wall is provided between every two adjacent display units of the plurality of display units.

4. The display substrate according to claim 3, wherein:
the reflectance of the light-reflecting wall to blue light is greater than the preset threshold, and the plurality of display units comprises a red light quantum dot display unit for emitting red light, a green light quantum dot display unit for emitting green light, and a light-transmissive unit for transmitting blue light; or
the reflectance of the light-reflecting wall to green light is greater than the preset threshold, and the plurality of display units comprises a red light quantum dot display unit for emitting red light, a blue light quantum dot display unit for emitting blue light, and a light-transmissive unit for transmitting green light; or
the reflectance of the light-reflecting wall to red light is greater than the preset threshold, the plurality of display units comprises a green light quantum dot display unit for emitting green light, a blue light quantum dot display unit for emitting blue light, and a light-transmissive unit for transmitting red light.

5. The display substrate according to claim 1, wherein the light-reflecting wall is at a side of the black matrix pattern away from the base substrate.

6. The display substrate according to claim 1, wherein the black matrix pattern comprises a plurality of light-shielding units, and an area of an orthographic projection of the light-reflecting wall onto the base substrate is less than or equal to an area of an orthographic projection of the light-shielding unit onto the base substrate.

7. The display substrate according to claim 1, wherein the black matrix pattern comprises a plurality of light-shielding units, and an area of an orthographic projection of the light-reflecting wall onto the base substrate is greater than an area of an orthographic projection of the light-shielding unit onto the base substrate.

8. The display substrate according to claim 1, wherein a material of the light-transmissive wall is resin.

9. The display substrate according to claim 1, wherein a distance between a top surface of the light-reflecting wall and the base substrate is not less than a distance between a top surface of the display unit and the base substrate, the top surface of the light-reflecting wall is a surface of the light-reflecting wall away from the base substrate, and the top surface of the display unit is a surface of the display unit away from the base substrate.

10. A method for manufacturing a display substrate, comprising:
forming a black matrix pattern and a plurality of display units on a base substrate, wherein the plurality of display units is respectively in a plurality of regions defined by the black matrix pattern; and
forming a light-reflecting wall between at least two adjacent display units, wherein at least one display unit of the at least two adjacent display units is a quantum dot display unit, and a reflectance of the light-reflecting wall to light in a first wavelength range is greater than a preset threshold;
wherein forming the light-reflecting wall between the at least two adjacent display units comprises:
forming a light-transmissive wall at a side of the black matrix pattern away from the base substrate; and
forming a light-reflecting layer covering a top surface and side surfaces of the light-transmissive wall at the side of the black matrix pattern away from the base substrate;
wherein forming the light-reflecting layer comprises:
forming a plurality of first refractive films and a plurality of second refractive films, wherein the first refractive films and the second refractive films are arranged alternately in a stacked manner, and a refractive index of the first refractive films and a refractive index of the second refractive films are different, and the first refractive films are made of TiO2 and the second refractive films are made of SiO2;
wherein the light-reflecting layer comprises:
4 first refractive films and 3 second refractive films; or
5 first refractive films and 4 second refractive films; or
6 first refractive films and 5 second refractive films; or
7 first refractive films and 6 second refractive films; and
wherein a thickness of the first refractive films and a thickness of the second refractive films are set such that a reflectance of the light-reflecting layer to light in a first wavelength range is greater than a preset threshold of 80%.

11. A display device, comprising a display substrate, wherein the display substrate comprises:
a base substrate;
a black matrix pattern on the base substrate;
a plurality of display units respectively in a plurality of regions defined by the black matrix pattern; and
a light-reflecting wall between at least two adjacent display units, wherein at least one display unit of the at least two adjacent display units is a quantum dot display unit;
wherein the light-reflecting wall comprises:
a light-transmissive wall; and
a light-reflecting layer covering a top surface and side surfaces of the light-transmissive wall, wherein a reflectance of the light-reflecting layer to the light in the first wavelength range is greater than the preset threshold;
wherein the light-reflecting layer comprises a plurality of first refractive films and a plurality of second refractive films, the first refractive films and the second refractive films are arranged alternately in a stacked manner, a refractive index of the first refractive films and a refractive index of the second refractive films are different, and the first refractive films are made of TiO2 and the second refractive films are made of SiO2;
wherein the light-reflecting layer comprises:
4 first refractive films and 3 second refractive films; or
5 first refractive films and 4 second refractive films; or
6 first refractive films and 5 second refractive films; or
7 first refractive films and 6 second refractive films; and
wherein a thickness for first refractive films and a thickness for second refractive films are set such that a reflectance of the light-reflecting layer to light in a first wavelength range is greater than a preset threshold of 80%.

12. The display device according to claim 11, further comprising:
an array substrate opposite to the display substrate;
a liquid crystal layer between the display substrate and the array substrate;
a backlight module at a side of the array substrate away from the display substrate;
wherein the liquid crystal layer is at a light-emitting side of the backlight module, the light in the first wavelength range is blue light, and the backlight module is a blue light backlight module.

13. The display device according to claim 12, further comprising:
a first polarizer between the array substrate and the backlight module; and
a second polarizer between the liquid crystal layer and the display substrate, wherein a direction of a light transmission axis of the second polarizer is perpendicular to a direction of a light transmission axis of the first polarizer.

14. The display device according to claim 13, wherein the second polarizer is a wire grip polarizer having a period in a range of 80 to 140 nm, a duty ratio in a range of 0.4 to 0.6 and a depth-to-width ratio in a range of 2:1 to 3:1.

* * * * *